United States Patent [19]

de Bennetot

[11] 4,122,423
[45] Oct. 24, 1978

[54] PERMANENT MAGNET MAGNETIC CONTROL DEVICE HAVING TWO CONTROL AIR GAPS

[75] Inventor: Michel Cotton de Bennetot, Brest, France

[73] Assignee: Le Material Magnetique, France

[21] Appl. No.: 791,635

[22] Filed: Apr. 27, 1977

[30] Foreign Application Priority Data

May 14, 1976 [FR] France .................................. 76 14569

[51] Int. Cl.² ............................................. H01H 47/00
[52] U.S. Cl. ........................................ 335/234; 361/156;
361/210
[58] Field of Search ........................ 361/156, 153, 210;
335/229, 232, 233, 234

[56] References Cited

U.S. PATENT DOCUMENTS

| | | | |
|---|---|---|---|
| 3,514,674 | 5/1970 | Toshio et al. | 361/210 |
| 3,798,581 | 3/1974 | Anderson et al. | 335/234 |
| 4,015,174 | 3/1977 | de Bennetot | 335/234 |

Primary Examiner—Gerald Goldberg
Attorney, Agent, or Firm—William Anthony Drucker

[57] ABSTRACT

A magnetic control device comprising one pair of permanent magnets cooperating with armatures to form first and second air gaps and, means for inverting the direction of magnetization of one magnet. In a first direction of magnetization, the flux closes through the first air gap, while, in the opposite direction, the flux is at least partially cancelled in the first air gap and passes through the second air gap, which is substantially smaller than the first air gap. Such a device is adapted to actuate a two way valve.

4 Claims, 9 Drawing Figures

PERMANENT MAGNET MAGNETIC CONTROL DEVICE HAVING TWO CONTROL AIR GAPS

The invention relates to magnetic control devices, having permanent magnets, capable of producing a magnetic induction in a zone of space, and of eliminating this induction by inverting the direction of magnetizing of certain of the permanent magnets by means notably of impulses of current of short duration.

Such devices are described in the U.S. Pat. Nos. 3,089,064 and 4,015,174 filed Feb. 3, 1959 and July 30, 1975, respectively, in the name of Michel Cotton de Bennetot, for "Combined permanent magnet and electromagnet" and "Devices for magnetic control with permanent magnets", respectively.

In certain applications it would be interesting to have magnetic control apparatus having not a single face of attraction but two separate faces of variable attractive force. Such magnetic valves with two air gaps or active faces could for example serve as an actuating member for a two-way valve or of a single-way valve offering the possibility of locking in one of its two positions.

The magnetic control device according to the invention comprises at least one pair of permanent magnets cooperating with armatures to constitute a body forming a first air gap, means for inverting the direction of magnetization of one of the magnets in such a manner as to modify the path of the magnetic flux in said body, whilst obliging it, for a first direction of magnetization, to close when passing through this first air gap, the magnetic fluxes from the two magnets then adding, and, for the other direction of magnetization, to close across the two magnets traversed in series, thus eliminating at least partially the flux in this first air gap, and is characterised in that the said body forms a second air gap and that, for said other direction of magnetization, at least a part of the magnetic flux passes through the second air gap, the length of the second air gap being then substantially less than that of the first.

The invention will be better understood with the aid of the following description.

Figure 5:
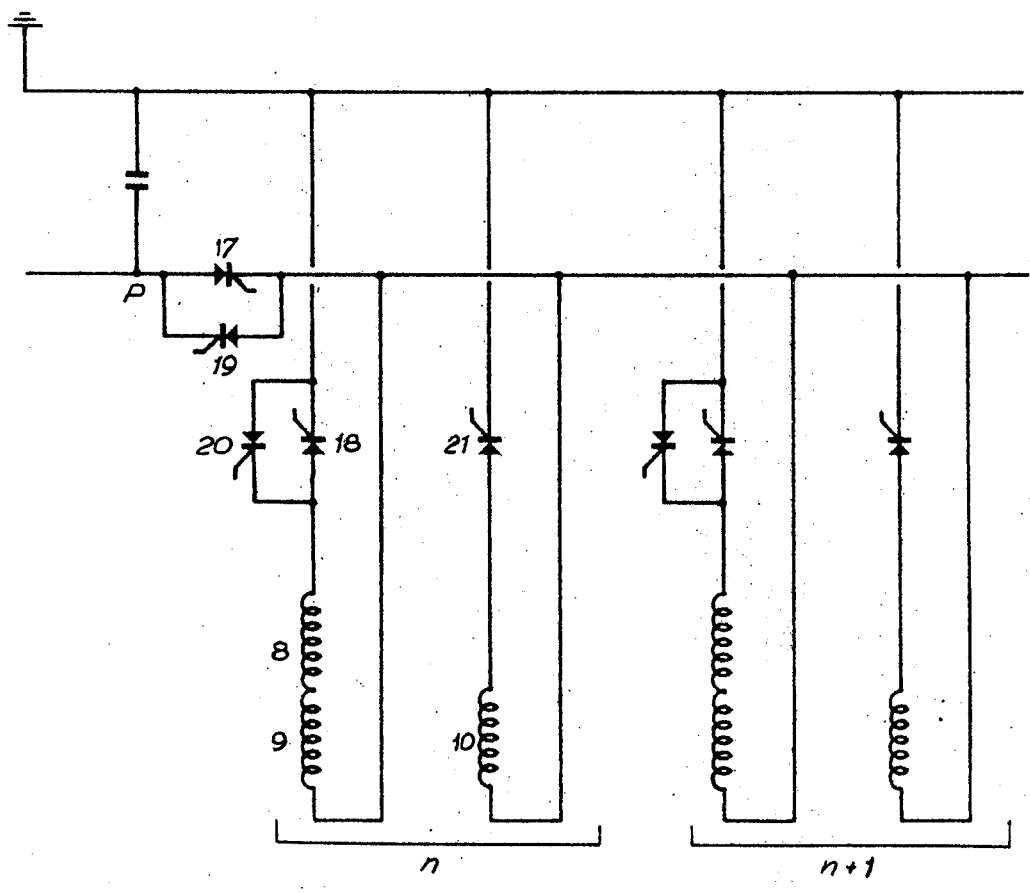
Figure 6:
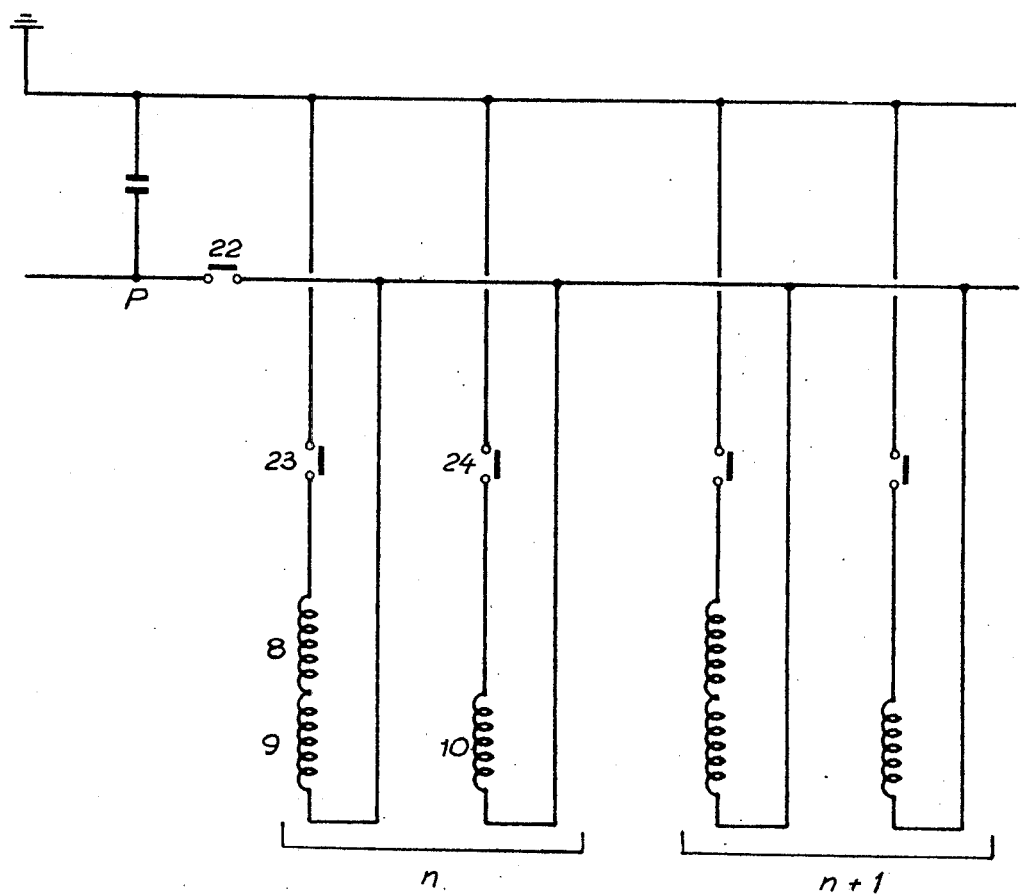

FIG. 5 shows a generator of impulses of current, equipped with electronic selector feed components permitting the feeding of a plurality of magnetic devices in accordance with the invention, mounted in parallel, and FIG. 6 shows a generator of impulses of current, equipped with electronic selector feed components, likewise permitting the feeding of a plurality of magnetic devices in accordance with the invention, mounted in parallel.

Figure 1:
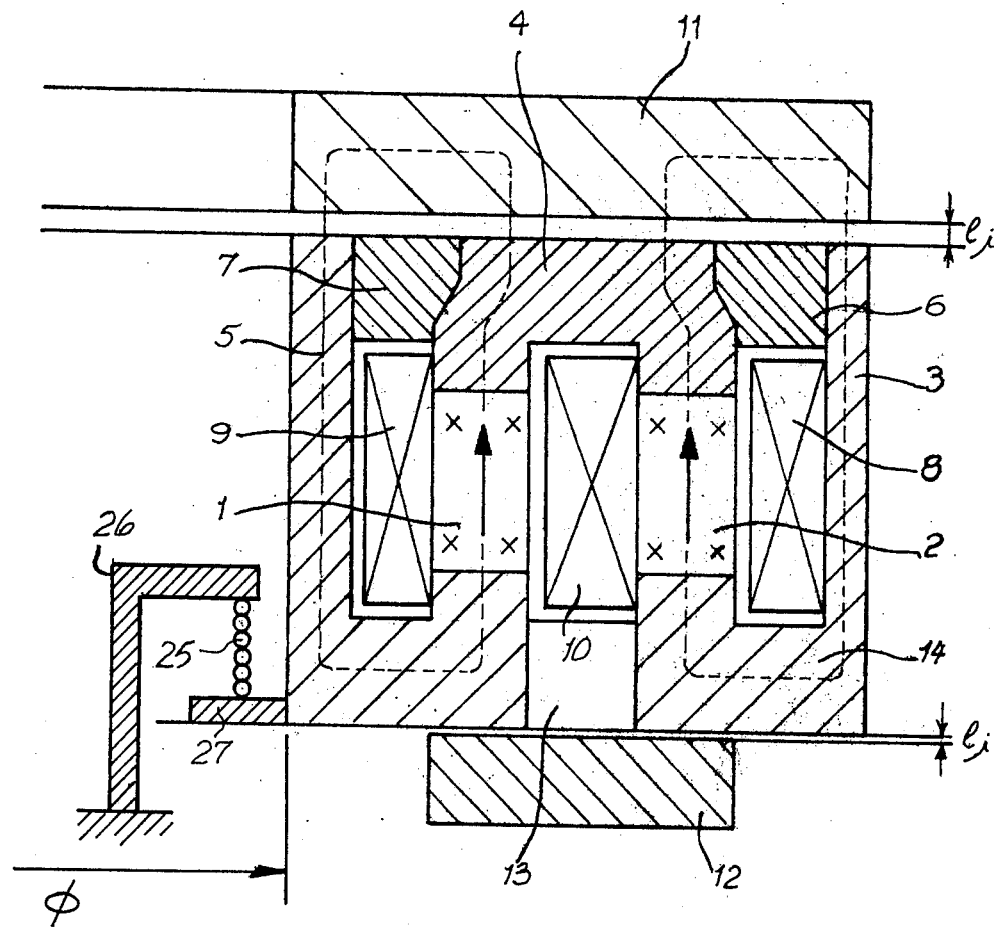
FIG. 1 is a schematic view showing the principle of a magnetic device according to the invention, shown in the phase of operation in which the two magnets are magnetized in the same direction and produce a force of attraction between the armatures and a first pole piece.

In FIG. 1 there is shown half of a magnetic device, symmetrical in revolution, which comprises two rings of permanent magnets 1 and 2 placed in a circuit comprising three steel armatures; an external armature 3, an intermediate armature 4, an internal armature 5.

These magnetic elements are separated by amagnetic elements, such as 6 and 7, of stainless steel for example, and the device further comprises excitation windings such as 8 and 9 placed at one side and the other of the magnets, and a winding such as 10 placed between the magnets.

At the upper part of the device there has been shown a first pole piece 11 which is separated from the armatures 3, 4 and 5 by an air gap of length $1_s$.

At the lower part of the device there has been shown a second pole piece 12 which is separated from the return of the yoke of the armatures 3 and 5 by an air gap of length $1_i$. Between these returns of the yoke there is formed an amagnetic zone 13.

The operation of the device is the following: when the rings of magnets 1 and 2 are magnetized in the same direction, which is obtained by sending an impulse of current of short duration into the windings 8 and 9, the magnetic flux follows the path indicated in broken line in FIG. 1. It can be seen that the flux issuing from the magnet 1 passes across the intermediate armature 4, then closes onto the internal armature 5 after having passed over the gap of length $1_s$ a first time, the pole piece 11 in the radial direction and again the gap of length $1_s$. At the lower part of the device, the external armature 5 comprises a part in contact with the magnet 1, which permits the flux to close up again on this latter. The flux issuing from the magnet 2 follows an analogous path which conducts it across the intermediate armature 4 as far as the external armature 3 whilst crossing on two occasions the air gap which separates these armatures from the pole piece 11. It will be appreciated that the path of the magnetic fluxes issuing from the magnets 1 and 2 does not cross the amagnetic zone 13.

Under these conditions of magnetization, a force of attraction is exerted between the armatures 3, 4 and 5 and the pole piece 11. This force tends to reduce the air gap $1_s$ according to the extent that one of the abovementioned elements thereabove is movable. By way of example, the pole pieces 11 and 12 are fixed and the body 14, constituted by the magnets, the armatures and the windings, is capable of moving. The force of attraction which is exerted between the upper part of the body and the pole piece 11 will then tend to diminish the air gap $1_s$ and to eliminate, by countering the action of an opposing force which, apart from the weight of the body, could be due to mechanical elements, such as springs, shown at 25, for instance secured between two fixed members 26–27.

Figure 2:
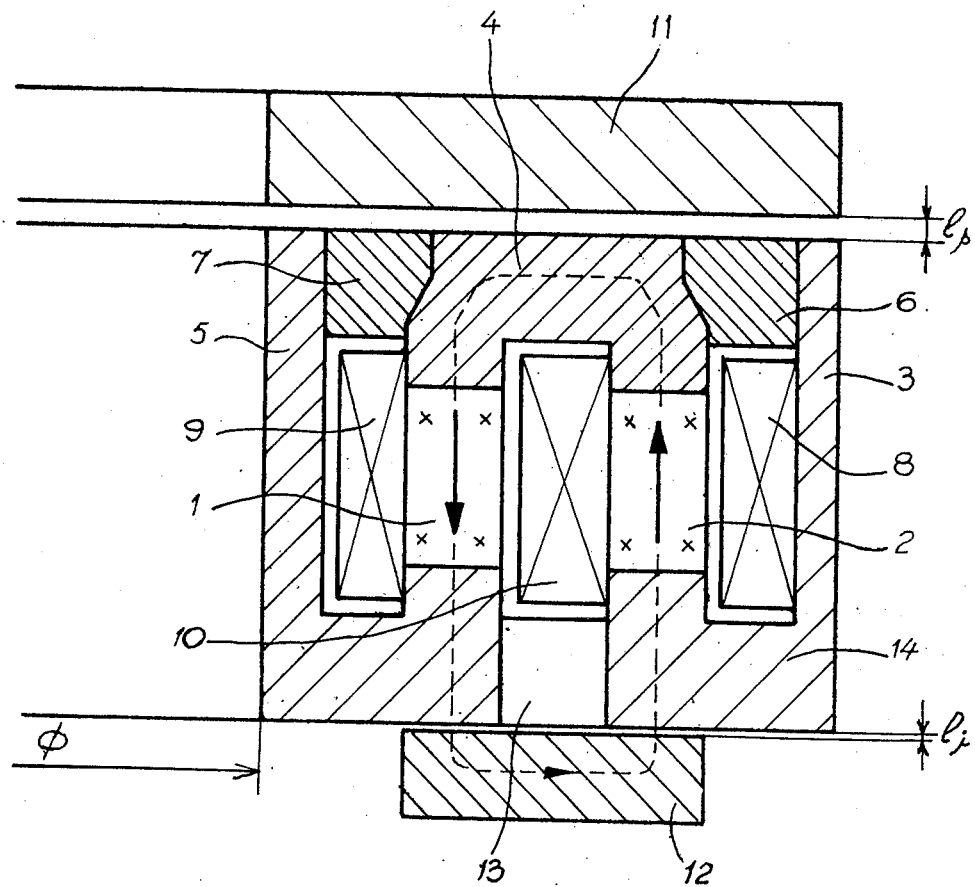
FIG. 2 shows the same magnetic device in the phase of operation wherein the two magnets are magnetized in inverse direction one to the other and produce a force of attraction between the armatures and a second pole piece.

FIG. 2 shows the same device in the case corresponding to a magnetization in the opposite direction of the rings of magnets, obtained by feeding the winding 10 by means of an impulse of current. It will be seen that the flux issuing from the magnet 1 follows the path shown in broken line on FIG. 2 and which successively traverses: the lower part of the internal armature 5, the air gap of length $1_i$ between this armature and the lower pole piece 12, again the air gap of length $1_i$ between this pole piece and the external armature 3, the ring of magnets 2 and the return path on the magnet 1, across the intermediate armature 4.

According to the extent by which the length of the air gap $1_i$ is considerably less than that of the air gap $1_s$, the major part of the flux produced by the magnets 1 and 2 will follow the path which has just been indicated; a small part will likewise be dispersed between the armatures 3, 4, 5 and the pole piece 11. It will thus be convenient, when the magnets are magnetized in opposed direction, to respect the condition indicated above, that is to say that the length of the air gap $1_i$ remains considerably less than that of the air gap $1_s$, if it is desired that the force of attraction between the pole piece 12 and the body 14 is taken away from that which is exerted, under these conditions of magnetization, between said body and the pole piece 11.

The magnetic device, of which the operation has just been described, thus appears capable, according to whether the magnets 1 and 2 are magnetized in the same direction or in the opposite direction, to produce a force of attraction, either on its upper face, or under the condition which has has been given above concerning the relative value of the lengths of air gaps, on its lower face. It thus constitutes an improvement to the magnetic circuit described in the U.S. Pat. Nos. 3,089,064 and 4,015,174 referred to above which comprise only a single face of attraction and in which the inversion of the magnetism in one of the magnets is used to establish or eliminate the force of attraction in the region of this face.

Figure 3:
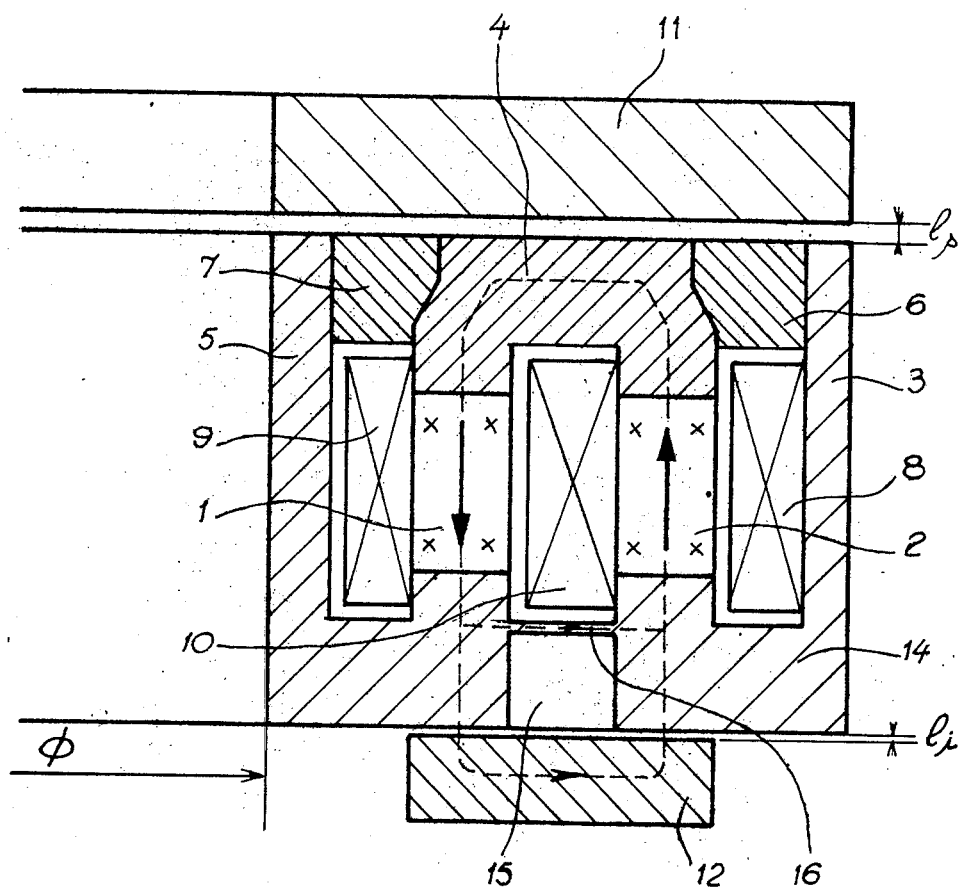
FIG. 3 shows schematically a method of construction of the device, in which the body which contains the magnets and the excitation windings is formed in a fluid tight manner in order to be able to resist corrosion by a noxious fluid.

For certain applications, concerning notably the operation of the device in a corrosive atmosphere, it is useful to assure the fluid tightness of the body 14, particularly by avoiding any contact between the corrosive fluid and the internal organs of the body, such as the windings and the magnets. For these reasons, one can replace the amagnetic zone 13 by the combination, shown in FIG. 3, of an amagnetic zone such as 15 and a fluid tight wall 16 placed in the region of the winding 10 as is indicated in FIG. 3 or again in a different position, for example in the region of the pole piece 12. This fluid tight wall can be constituted either by an amagnetic material, or, which has advantages from the technological point of view, by a magnetic material across which a part of the flux is passed. This latter arrangement leads to a reduction of the force of attraction between the body and the pole piece 12. This reduction can be tolerated to the extent that, on the other hand, the fluid tightness of the body is obtained in a simple manner, by assembly of materials of the same characteristics.

The manner in which the circuit which has been described can be put to work will now be described with reference to FIGS. 4a to 4d.

Figure 4C:
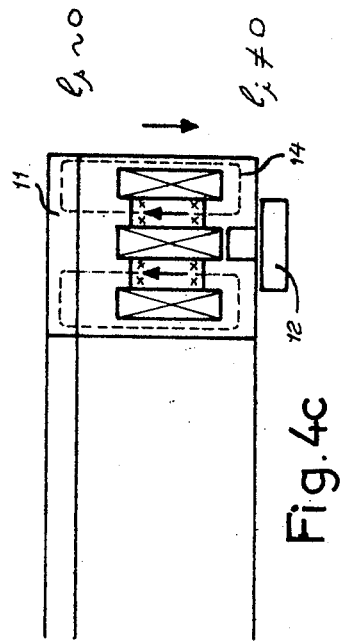
FIGS. 4a to 4d illustrate different phases of operation of such a magnetic device.
Figure 4D:
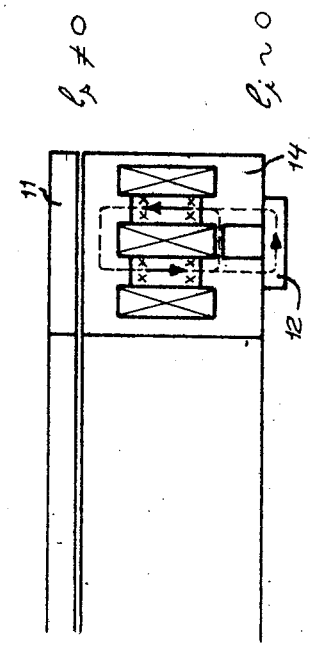
Figure 4B:
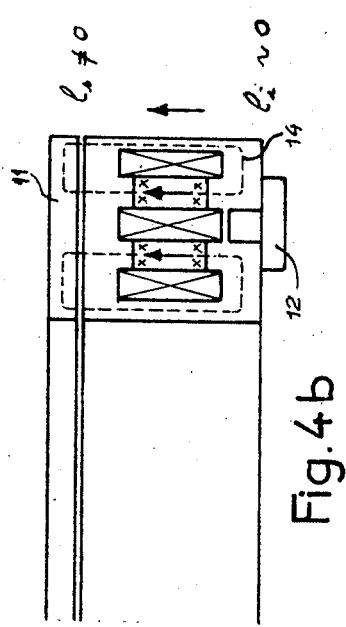
Figure 4A:
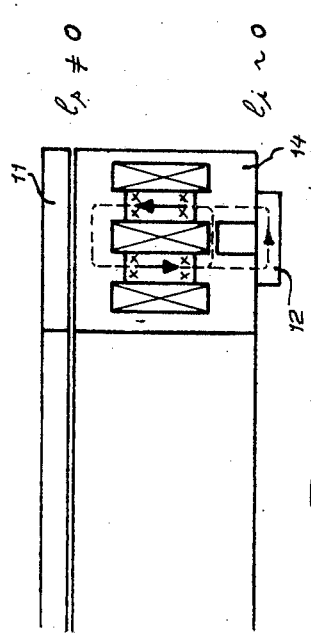

FIG. 4a shows the movable body 14 placed between the fixed pole pieces 11 and 12 and it is supposed that the gap $1_i$ is of a very short length or is non-existant. The magnets 1 and 2 having been magnetized, by means of the winding 10 in inverse direction, and the air gap $1_s$ being of a length considerably greater than that of the air gap $1_i$, the major part of the flux issuing from the magnets follows the path indicated in FIG. 4a in broken line. A force of attraction is thus exerted between the body 14 and the lower pole piece 12.

The following phase of operation is shown on FIG. 4b. By applying to the windings 8 and 9 an impulse of current of short duration, the two rings of magnets 1 and 2 are magnetized in the same direction. The fluxes issuing from the magnets then follow the path indicated in broken line in FIG. 4b. A force of attraction is exerted, under these conditions of magnetization, between the body 14 and the upper pole piece 11, whilst the force which was exerted between the body 14 and the lower pole piece 12 is simultaneously eliminated.

The body 14, assumed to be movable, approaches the pole piece 11 and the air gap $1_s$ diminishes and eventually becomes zero (FIG. 4c). A mechanical spring system, for example, can moreover be provided to serve as a return means for body in the low position; to the extent that the force of magnetic attraction is greater than the opposing force thus produced by the weight of the body 14 and the action of the spring, the air gap $1_s$ tends towards zero, as has been indicated.

By affecting the intensity of magnetization of the magnets 1 and 2, one can diminish the force of magnetic attraction and make it for example lower than the mechanical returning force. This result can be obtained by using for example the windings 8 and 9 to which there is applied an impulse of current with a direction counter to that which has been utilised during the operation of magnetization relating to FIG. 4b. After passage of this impulse of current, the intensity of magnetization of the magnets 1 and 2 is then, if not eliminated, at least very much reduced. Under the effect of the opposing system, the body 14 thus tends to move towards the low position; the air gap $1_i$ then becomes very small, or zero, and consequently, of a length less than that of the air gap $1_s$.

FIG. 4d shows the body 14 in the low position. If the direction of magnetization of one of the magnets is reversed by means of the winding 10, the flux issuing from the magnets follows a major part of the path indicated in broken line on the figure. A force of attraction is produced between the body 14 and the lower pole piece 12. Things have thus returned to the initial state of magnetization shown in FIG. 4a.

The magnetic device which has been described requires, for its operation, an electric supply which can advantageously be constituted by a generator delivering impulses of current of short durection and utilizing the discharge of a battery of condensors. This latter can be coupled to the excitation windings of the magnets by electronic or electromechanical selector feeding means.

FIG. 5 shows the feeding of a plurality of magnetic devices mounted in parallel on an impulse generator.

In order to magnetize in the same direction the magnets of the magnetic device of row $n$, the battery of condensors is charged for example in such a manner that the point P is placed at a positive voltage and this battery is discharged into the windings 8 and 9 of the device of row $n$ by making the unidirectional electronic components 17 and 18 conductive. In order to demagnetize the magnets of the same device, one can use again the windings 8 and 9, but by giving to them an impulse of current which is of an intensity less strong than precedingly, and in the reverse direction. For this purpose, it is necessary to place the point P at a negative voltage, and to open the unidirectional electronic components 19 and 20.

To reverse the direction of magnetization of one of the magnets of the devices of row $n$, the battery of condensors is charged in such a manner that the point P is placed at a positive voltage and the winding 10 is fed by making conductive the unidirectional electronic components 17 and 21.

In the variant of FIG. 6 there are used electromechanical contactors, for magnetizing in the same direction the magnets of the device of row $n$, the point P is placed at a positive voltage and the battery of condensors is discharged into the windings 8 and 9 by closing the contactors 22 and 23. In order to demagnetize the magnets of the same device, there can again be used the windings 8 and 9 and deliver to them an impulse of current of intensity less than during the course of the preceding operation and in the opposite direction. For this purpose the point P is placed at a negative voltage, the battery of condensors is discharged into the windings 8 and 9 by closing the contactors 22 and 23.

In order to reverse the direction of magnetization of one of the magnets of the device of row $n$, the battery of condensors is charged in such a manner that the point P is placed at a positive voltage and the winding 10 is fed by closing the contactors 22 and 24.

It is needless to say that one may combine the use of electronic components and electromechanical contacts and, for example, replace in FIG. 6, the contactor 22 by a set of unidirectional electronic components disposed as is indicated in FIG. 5 under reference numerals 17 and 19.

It is to be understood that the device described and shown could be the subject of variations of construction without thereby exceeding the scope of the invention. For example, they could be otherwise than having symmetry of revolution. Further, their application to the construction of magnetic valves is not limiting.

I claim:

1. A magnetic control device comprising first and second permanent magnets, each having first and second pole ends, an intermediate armature member magnetically connecting the first pole ends of the respective permanent magnets, first and second armature yoke members each having a second end portion which is in contact with the second pole end of the respective permanent magnet and a first end portion; first and second amagnetic zones respectively separating the first end portions of the first and second armature yoke members from the intermediate armature; a first pole piece forming a first air gap with the intermediate armature and with the said first end portions; a third amagnetic zone separating the second end portions of said armature yoke members from each other; a second pole piece forming a second air gap with the said second end portions, the second air gap being substantially smaller than the first air gap and means adapted to reverse the direction of magnetic polarization of one of said first and second permanent magnets.

2. A magnetic control device as claimed in claim 1 wherein said permanent magnets, said intermediate armature and said armature yoke members together form an integral body which is movable relative to the first and second pole pieces with which it forms respectively the first and the second air gaps, and mechanical means for resetting said body towards the second pole piece.

3. A magnetic control device as claimed in claim 1 wherein said third amagnetic zone is an air space.

4. A magnetic control device as claimed in claim 1, wherein said third amagnetic zone is an air space and a magnetic fluid tight wall connects the said second end portions together.

* * * * *